United States Patent [19]

Sugiyama

[11] Patent Number: 5,052,234
[45] Date of Patent: Oct. 1, 1991

[54] WATER PROOF STRUCTURE FOR ENGINE STARTER MOTOR

[75] Inventor: Takeshi Sugiyama, Himeji, Japan

[73] Assignee: Mitsubishi Denki Kabushiki Kaisha, Tokyo, Japan

[21] Appl. No.: 487,514

[22] Filed: Mar. 2, 1990

[30] Foreign Application Priority Data

Mar. 3, 1989 [JP] Japan .................................. 1-52261

[51] Int. Cl.$^5$ ............................................. F02N 11/00
[52] U.S. Cl. .......................................... 74/6; 74/7 R; 123/179 M; 290/48
[58] Field of Search ................ 74/6, 7 R; 123/179 M; 290/38 R, 38 C, 48

[56] References Cited

U.S. PATENT DOCUMENTS

| 4,440,033 | 4/1984 | Kurihara et al. | 74/7 E |
| 4,718,290 | 1/1988 | Murata et al. | 74/7 R |
| 4,737,654 | 4/1988 | Morishita et al. | 290/48 |
| 4,779,470 | 10/1988 | Morita et al. | 74/7 E |

FOREIGN PATENT DOCUMENTS

| 2801571 | 7/1979 | Fed. Rep. of Germany | 290/48 |
| 61-291769 | 12/1986 | Japan | 290/48 |
| 63-253170 | 10/1988 | Japan | 290/48 |

Primary Examiner—Leslie A. Braun
Assistant Examiner—Scott Anchell
Attorney, Agent, or Firm—Sughrue, Mion, Zinn, Macpeak and Seas

[57] ABSTRACT

A water proof structure for a use in a starter motor comprising a front bracket, an over-running clutch axially slidably supported on a rotary shaft, and a pinion mounted to the over-running clutch and movable between a forward position for engagement with an engine ring gear and a rearward position for disengagement from the engine ring gear. The front bracket includes a tubular wall 22 surrounding the over-running clutch and having formed therein an opening for allowing the pinion in the forward position to be projected therethrough and a moisture drain opening 20c in its bottom. The water proof structure comprises a radial wall 25 extending from the front bracket toward a front end of the pinion in the forward position for substantially closing a gap between the tubular wall and the pinion. At the corner of the bottom portion of the radial wall and the tubular wall, a moisture drain hole 27 is provided.

1 Claim, 2 Drawing Sheets

WATER PROOF STRUCTURE FOR ENGINE STARTER MOTOR

BACKGROUND OF THE INVENTION

This invention relates to a water proof structure for an engine starter motor for use in a vehicle and, more particularly, to a water proof structure provided in a front bracket of the starter motor.

FIGS. 1 and 2 are a sectional side view and a front view, respectively of an engine starter motor with a conventional water proof structure. In FIGS. 1 and 2, The engine starter motor comprises a d.c. motor 1 having a yoke 2 to which a plurality of magnetic poles 3 are attached. A rear bracket 4 is secured to the rear end of the yoke 2, and a front bracket 5 is secured to the front end of the yoke 2. The rear bracket 4 and the front bracket 5 rotatably support the rotary shaft 7 of an armature 6 through rear and front bearings 8 and 9. The rear bracket 4 also supports a brush assembly 10.

Within the front bracket 5, an over-running clutch 11 axially slidably mounted on the rotary shaft 7 is disposed. The over-running clutch 11 includes a clutch inner member (not shown) on which a pinion 12 is integrally formed. In order to limit the forward movement of the pinion 12 along the rotary shaft 7, a stopper 13 is disposed on the rotary shaft 7.

The starter also comprises a solenoid switch 14 which, when actuated, magnetically attracts a plunger 15 to pull a hook 16 rearward. The hook 16 of the solenoid switch 14 is connected to one end of a shift lever 17 which is pivotaly supported by the front bracket 5 at the pivot point 17a and connected at the other end to the over-running clutch 11 for axially moving the over-running clutch 11 and the pinion 12 back and forth on the rotary shaft 7.

The front bracket 5 has formed therein an opening 5a for allowing the pinion to project therethrough and engage a ring gear (not shown) of an engine to be started when the starter is actuated. The front bracket 5 also has formed at the bottom portion of the rear edge abutting against the front edge of the yoke 2 a water draining notch 5b which defines together with the front edge of the yoke 2 a draining hole 5c.

When the solenoid switch 14 is energized, the plunger 15 pulls the hook 16 rearwadly to cause the counter-clockwise rotation of the shift lever 17 about the pivot point 17a. Then, the shift lever 17 causes the over-running clutch 11 to slide forward along the rotary shaft 7 to bring the pinion 12 on the clutch inner member of the over-running clutch 11 into engagement with the engine ring gear (not shown). Simultaneously with the forward movement of the pinion 12, movable contacts (not shown) on the plunger 15 of a solenoid switch 14 engage the stationary contact (not shown), whereby an electric power source is connected to the d.c. motor 1 to rotate the motor armature 6 which, through the pinion 12, causes the engine ring gear to be driven to start it.

With the conventional water proof structure for an engine starter motor as explained above, water splashes or water drops can enter into the starter through the pinion opening 5a of the front bracket 5. The entered water or mositure is discharged from the housing through the draining hole 5c formed in the front bracket 5. However, particularly when a large amount of water has entered into the front bracket 5, the water may enter into the yoke 2 and the rear bracket 4, causing the improper or erroneous operation of the engine starter motor.

SUMMARY OF THE INVENTION

Accordingly, one object of the present invention is to provide a water proof structure for an engine starter motor free from the above discussed problems of the conventional water proof structure.

Another object of the present invention is to provide a water proof structure for an engine starter motor in which the ingress of water is prevented.

Another object of the present invention is to provide a water proof structure for an engine starter motor in which the ingress of water is greatly reduced and in which the water, if entered, can be quickly discharged.

Still another object of the present invention is to provide a water proof structure for an engine starter motor in which the erroneous operation of the starter due to ingress of moisture is prevented.

With the above objects in view, the water proof structure of the present invention is used for an engine starter motor comprising a front bracket, an over-running clutch axially slidably supported on the rotary shaft, and a pinion mounted to the over-running clutch and movable between a forward position for engagement with an engine ring gear and a rearward position for disengagement from the engine ring gear. The front bracket includes a tubular wall surrounding the over-running clutch and having formed therein an opening for allowing the pinion in the forward position to be projected therethrough and a moisture drain opening in its bottom. The water proof structure comprises a radial wall extending from the front bracket toward a front end of the pinion in the forward position for substantially closing a gap between the tubular wall and the pinion. At the corner of bottom portion of the radial wall and the tubular wall, a moisture drain hole is provided.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
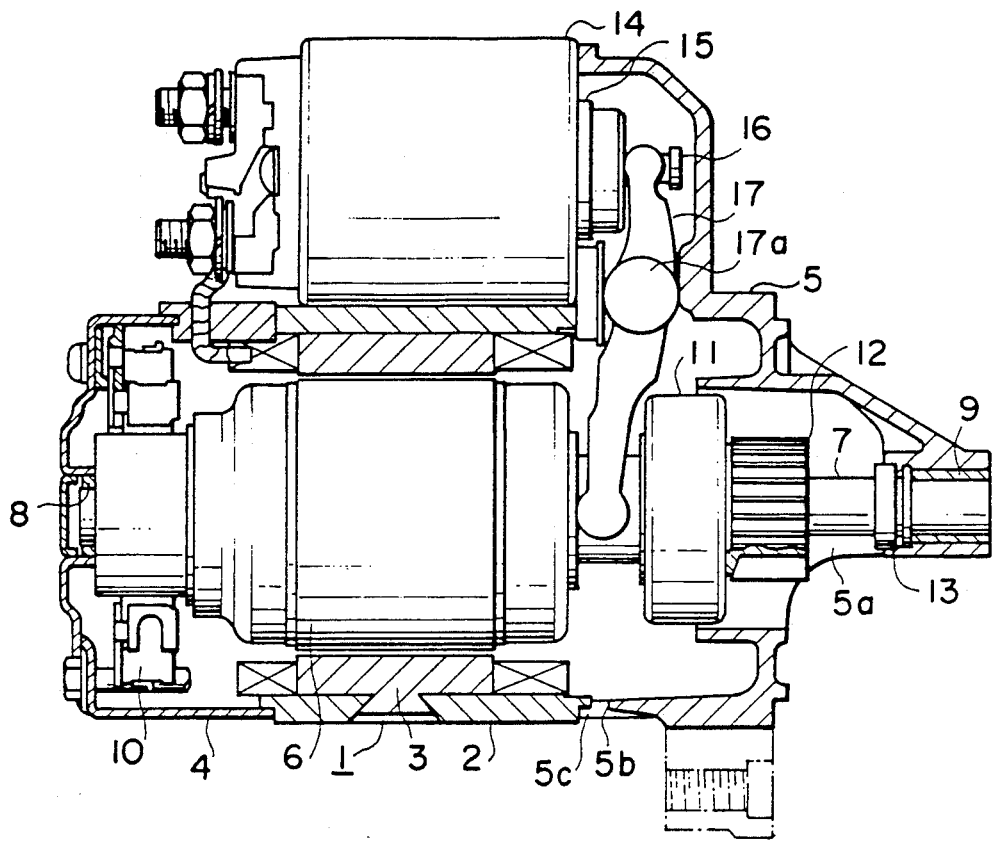
FIG. 1 is a sectional side view of an engine starter motor having a conventional water proof structure.
Figure 2:
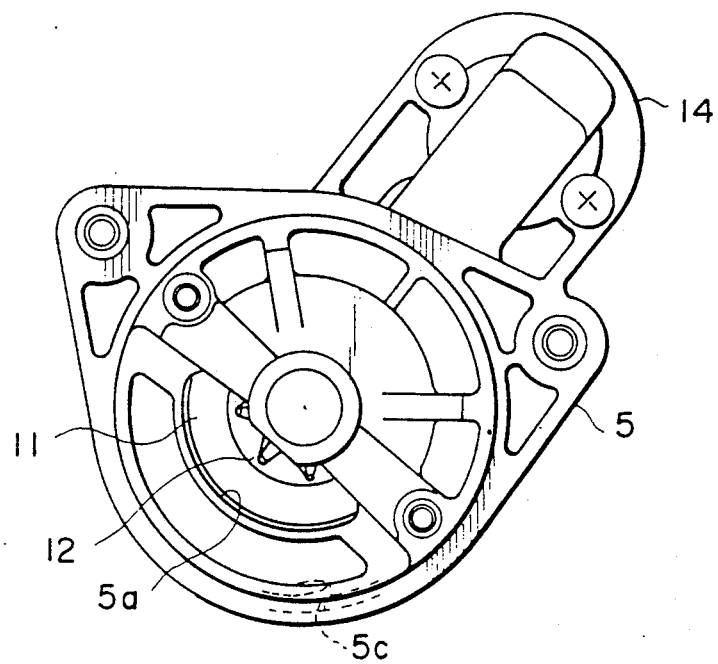
FIG. 2 is a front view of the engine starter motor illustrated in FIG. 1.
Figure 3:
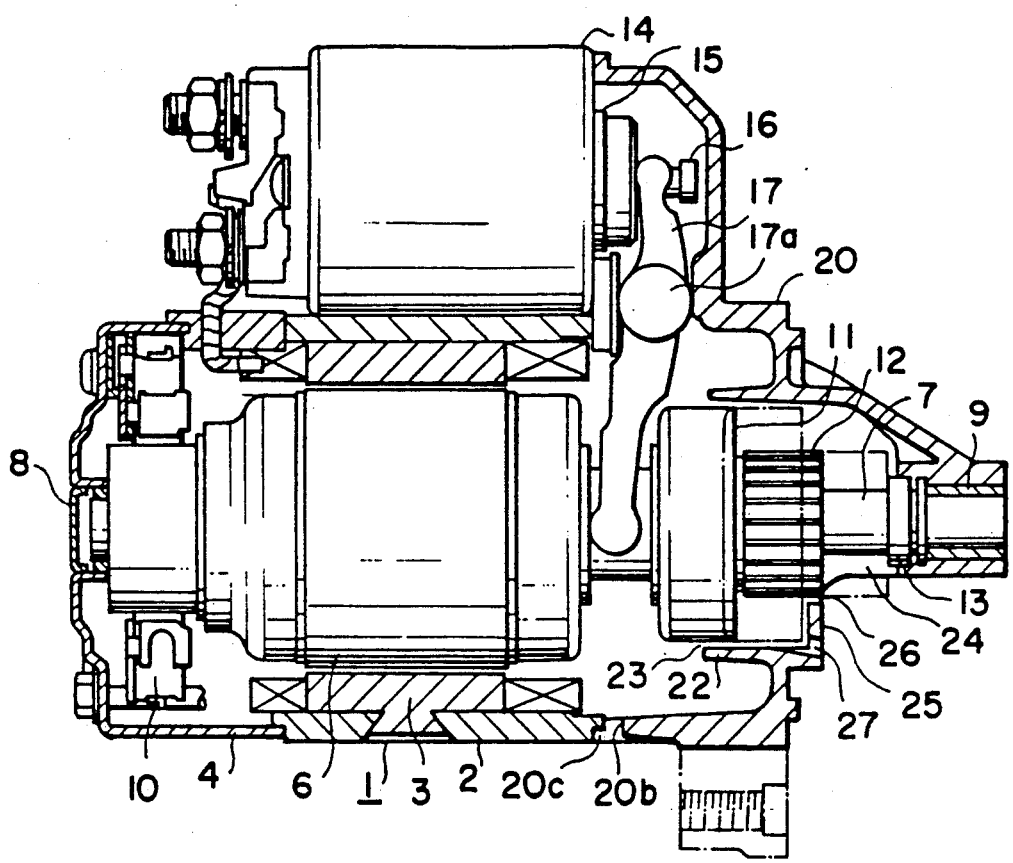
FIG. 3 is a sectional side view of an engine starter motor having a water proof structure of the present invention.
Figure 4:
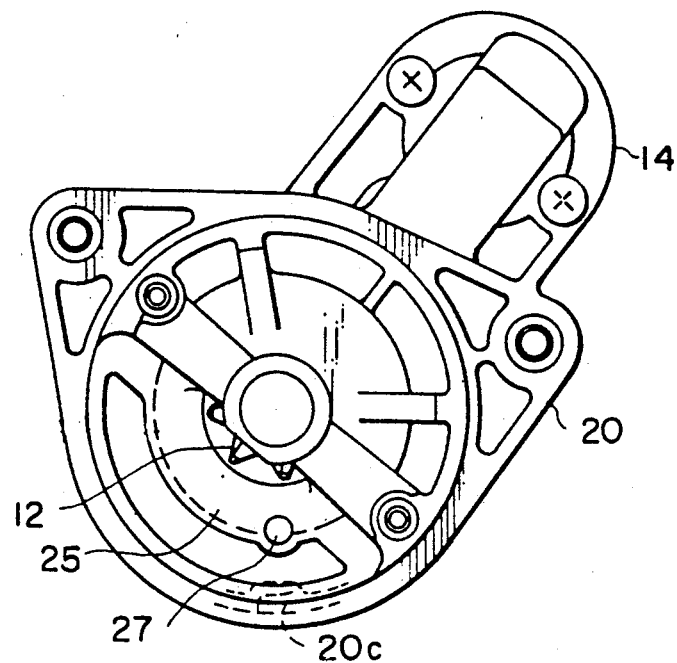
FIG. 4 is a front view of the engine starter motor illustrated in FIG. 3.

FIGS. 3 and 4 illustrate a water proof structure of the present invention as applied in an engine starter motor which has substantially the same structure as that of the engine starter motor illustrated in FIGS. 1 and 2. More particularly, the engine starter motor illustrated in FIGS. 3 and 4 comprises a d.c. motor 1 having a cylindrical yoke 2 within which a plurality of magnetic poles 3 are attached. A rear bracket 4 is secured to the rear end of the yoke 2, and a front bracket 20 is secured to the front end of the yoke 2 so as to rotatably support an armature rotary shaft 7 of an armature 6 of the d.c. motor 1 through rear and front bearings 8 and 9. The rear bracket 4 also supports a brush assembly 10.

Within the front bracket 20, an over-running clutch 11 is axially slidably mounted on the rotary shaft 7. The over-running clutch 11 includes a clutch inner member (not shown) on which a pinion 12 is integrally formed. In order to limit the forward movement of the pinion 12 along the rotary shaft 7 beyond a predetermined distance, an annular stopper 13 is mounted on the rotary shaft 7. The pinion 12 can be axially moved between a rearward position shown by solid lines in FIG. 3 in which the pinion 12 together with the over-running clutch 11 is in the rear-most position within the front bracket 20 and a forward position shown by dot-and-dash lines in FIG. 3 in which the over-running clutch 11 and the pinion 12 are moved forward until the front face of the pinion 12 abuts against the annular stopper 13 and the pinion 12 projects from the lower portion of the front bracket 20.

The starter also comprises a solenoid switch 14 which, when actuated, magnetically attracts a plunger 15 to pull a hook 16 rearward. The hook 16 of the solenoid switch 14 is connected to one end of a shift lever 17 which is pivotaly supported by the front bracket 20 at the pivot point 17a and connected at the other end to the over-running clutch 11 for axially moving the over-running clutch 11 back and forth on the rotary shaft 7. It is seen that the outer diameter of the over-running clutch 11 is larger than the outer diameter of the pinion 12.

The front bracket 20 has formed therein a tubular wall 22 surrounding the outer circumference of the over-running clutch 11 with a relatively small annular gap 23 therebetween so that the over-running clutch 11 is permitted to axially move within the tubular wall 22 without broadening the gap 23. The tubular wall 22 has formed therein an opening 24 for allowing the pinion 12 to project therethrough as shown by the dot-and-dash lines and engage a ring gear (not shown) of an engine (not shown) to be started when the starter is actuated. The tubular wall 22 has its front end at an axial position corresponding to the front end of the pinion 12, and has a radial wall 25 substantially radially extending from the front end of the tubular wall 22 toward the pinion 12 so that only a relatively small annular clearnace 26 is defined between the inner edge of the radial wall 25 and the outer circumference of the pinion 12. At the bottom of the corner portion between the tubular wall 22 and the radial wall 25, a moisture drain hole 27 is formed. The drain hole 27 has a circular cross section as shown in FIG. 4 and is slightly sloped as seen from FIG. 3 for good drainage.

The front bracket 20 also has formed at the bottom portion of the rear edge abutting against the front edge of the yoke 2 a water draining notch 20b which defines together with the front edge of the yoke 2 a draining hole 20c.

When the solenoid switch 14 is energized, the plunger 15 pulls the hook 16 rearwadly to cause the counter-clockwise rotation of the shift lever 17 about the pivot point 17a as viewed in FIG. 3. Then, the lower end of the shift lever 17 causes the over-running clutch 11 to slide forward along the rotary shaft 7 to bring the pinion 12 on the clutch inner member of the over-running clutch 11 into the forward position (dot-and-dash line in FIG. 3) for engagement with the engine ring gear (not shown). Simultaneously with the forward movement of the pinion 12, movable contacts (not shown) on the plunger 15 of the solenoid switch 14 engage the stationary contact (not shown), whereby an electric power source (not shown) is connected to the d.c. motor 1 to rotate the motor armature 6 which, through the pinion 12, causes the engine ring gear (not shown) to be driven to start it.

When water drops fly on the starter motor of the present invention, the radial wall 25 serves as a barrier against the ingress of the water drops irrespective of the axial position of the pinion 12. Since the annular gap 26 between the outer circumference of the pinion 12 and the radially inner edge of the radial wall 25 is small, ingress of water is effectively prevented. When water has entered inside of the front bracket 20 through the gap 26 or through another route, it is trapped by the tubular wall 22 and drained through the drain hole 27. If, for any reason, the water proceeds further through the small gap 23 between the tubular wall 22 and the over-running clutch 11 to fall on the inner surface of the front bracket 20, the water is drained through the discharge hole 20c defined between the front bracket 20 and the yoke 2.

As has been described, according to the present invention, the water proof structure comprises a radial wall extending from the front bracket toward a front end of the pinion in the forward position for substantially closing a gap between the tubular wall and the pinion. At the corner of bottom portion of the radial wall and the tubular wall, a moisture drain hole is provided. Therefore, the ingress of water into the interior of the front bracket can be greatly reduced and the water entered is trapped and collected by the tubular wall and drained through the drain hole provided at the corner of the bottom portion of the radial wall and the tubular wall. The water that has not thus discharged and fallen on the inner surface of the front bracket is drained through the discharge hole formed in the bottom of the front bracket.

What is claimed is:

1. A water proof structure for a starter motor comprising:
   a front bracket (20) attached to a yoke core (2) of an electric motor for supporting one end of a rotary shaft (7);
   an over-running clutch (11) axially slidably supported on said rotary shaft; and
   a pinion (12) mounted to said over-running clutch and movable between a forward, extended position and a rearward, retracted position;
   said front bracket having formed therein an opening (24) for allowing said pinion in said forward position to be projected therethrough, said front bracket having a drain opening (20c) in the bottom portion thereof;
   said water proof structure comprising:
   closure means extending from said front bracket toward an axially distal, with respect to said electric motor, end of said pinion when said pinion is disposed in said rearward position for substantially closing a gap between said front bracket and said pinion, said closure means having formed therein a moisture drain hole (27) at the bottom portion thereof, wherein said front bracket comprises a tubular wall (22) surrounding said over-running clutch with a small clearance (23) therebetween and extending over a distance between said forward position and said rearward position of said pinion;

said opening in said front bracket for projecting said pinion therefrom is provided in said tubular wall of said front bracket; and, said closure means is a substantially radial wall (25) extending from a front end of said tubular wall, said moisture drain hole being disposed at a corner portion between said tubular wall and said radial wall.

* * * * *